(12) United States Patent
Lambert et al.

(10) Patent No.: US 9,101,999 B2
(45) Date of Patent: Aug. 11, 2015

(54) WIRE FEED MOTOR SPEED CONTROL

(71) Applicant: Thermal Dynamics Corporation, West Lebanon, NH (US)

(72) Inventors: Roger H. Lambert, West Lebanon, NH (US); Geoffrey H. Putnam, Topsham, VT (US); Kevin Horner-Richardson, Cornish, NH (US)

(73) Assignee: Victor Equipment Company, Denton, TX (US)

( * ) Notice: Subject to any disclaimer, the term of this patent is extended or adjusted under 35 U.S.C. 154(b) by 321 days.

(21) Appl. No.: 13/650,575

(22) Filed: Oct. 12, 2012

(65) Prior Publication Data

US 2013/0092673 A1    Apr. 18, 2013

Related U.S. Application Data

(60) Provisional application No. 61/547,672, filed on Oct. 14, 2011.

(51) Int. Cl.
*B23K 9/10* (2006.01)
*B23K 9/12* (2006.01)

(52) U.S. Cl.
CPC ...................... *B23K 9/124* (2013.01)

(58) Field of Classification Search
CPC .......... B23K 9/12; B23K 9/124; B23K 9/125; B23K 9/133; B23K 9/1336

USPC ............................................ 219/137.7, 130.5
See application file for complete search history.

(56) References Cited

U.S. PATENT DOCUMENTS

| | | | |
|---|---|---|---|
| 6,974,933 B2 | 12/2005 | Rice et al. | |
| 2004/0164063 A1* | 8/2004 | Rice et al. | 219/130.21 |
| 2006/0016792 A1* | 1/2006 | Uecker et al. | 219/137.71 |
| 2006/0131291 A1* | 6/2006 | Kaufman et al. | 219/130.5 |

OTHER PUBLICATIONS

PCT Serial No. PCT/US2012/059965—Notification of Transmittal of the International Search Report and the Written Opinion of the International Searching Authority, Dated Jan. 30, 2013.

* cited by examiner

*Primary Examiner* — Brian Jennison
(74) *Attorney, Agent, or Firm* — Kacvinsky Daisak Bluni PLLC

(57) ABSTRACT

A system and a method are provided for improved run-in control during a start of a welding process. A power circuit generates welding output power. A control circuit in communication with the power circuit controls the output power. The control circuit receives a selection of a wire feed speed setting representing a wire feed speed. The control circuit receives a selection of a run-in setting representing a run-in percentage of the wire feed speed. The control circuit determines an effective run-in percentage that is equal to the run-in percentage plus an extra percentage.

24 Claims, 6 Drawing Sheets

US 9,101,999 B2

WIRE FEED MOTOR SPEED CONTROL

CROSS REFERENCE TO RELATED APPLICATIONS

This application claims the benefit of U.S. Provisional Patent Application No. 61/547,672 filed Oct. 14, 2011, the content of which is hereby incorporated by reference in its entirety.

BACKGROUND

The present application generally relates to improving run-in control in a welder.

SUMMARY

The present disclosure provides a system and a method for improved run-in control during a start of a welding process. In some implementations, the system may include a power circuit for generating welding output power and a control circuit in communication with the power circuit to control the output power. The control circuit may receive a selection of a wire feed speed setting representing a wire feed speed. The control circuit may further receive a selection of a run-in setting representing a run-in percentage of the wire feed speed. The control circuit may further determine an effective run-in percentage that is equal to the run-in percentage plus an extra percentage.

In some implementations, the method may include generating, by the power circuit, welding output power. The method may further include receiving, by the control circuit, a selection of a wire feed speed setting representing a wire feed speed. The method may further include receiving, by the control circuit, a selection of a run-in setting representing a run-in percentage of the wire feed speed. The method may further include determining, by the control circuit, an effective run-in percentage that is equal to the run-in percentage plus an extra percentage.

In some implementations, the system may include a power circuit for generating welding output power and a control circuit in communication with the power circuit to control the output power. The control circuit may receive a selection of a wire feed speed setting representing a wire feed speed. The control circuit may further receive a selection of a run-in setting representing a run-in speed that is a run-in percentage of the wire feed speed. The control circuit may further determine an effective run-in speed that is equal to the run-in speed plus an extra speed.

Further objects, features and advantages of this application will become readily apparent to persons skilled in the art after a review of the following description, with reference to the drawings and claims that are appended to and form a part of this specification.

BRIEF DESCRIPTION OF THE DRAWINGS

The drawings described herein are for illustration purposes only and are not intended to limit the scope of the present disclosure in any way.

FIG. 2b is a front view of an interface on the housing of FIG. 2a;

It should be understood that throughout the drawings, corresponding reference numerals indicate like or corresponding parts and features.

DETAILED DESCRIPTION

The term "substantially" or "about" used herein with reference to a quantity or mathematical relationship includes (1) a variation in the recited quantity or relationship of an amount that is insubstantially different from a recited quantity or relationship for an intended purpose or function, or (2) a variation in the recited quantity or relationship of an amount that produces the same quality.

Figure 1:
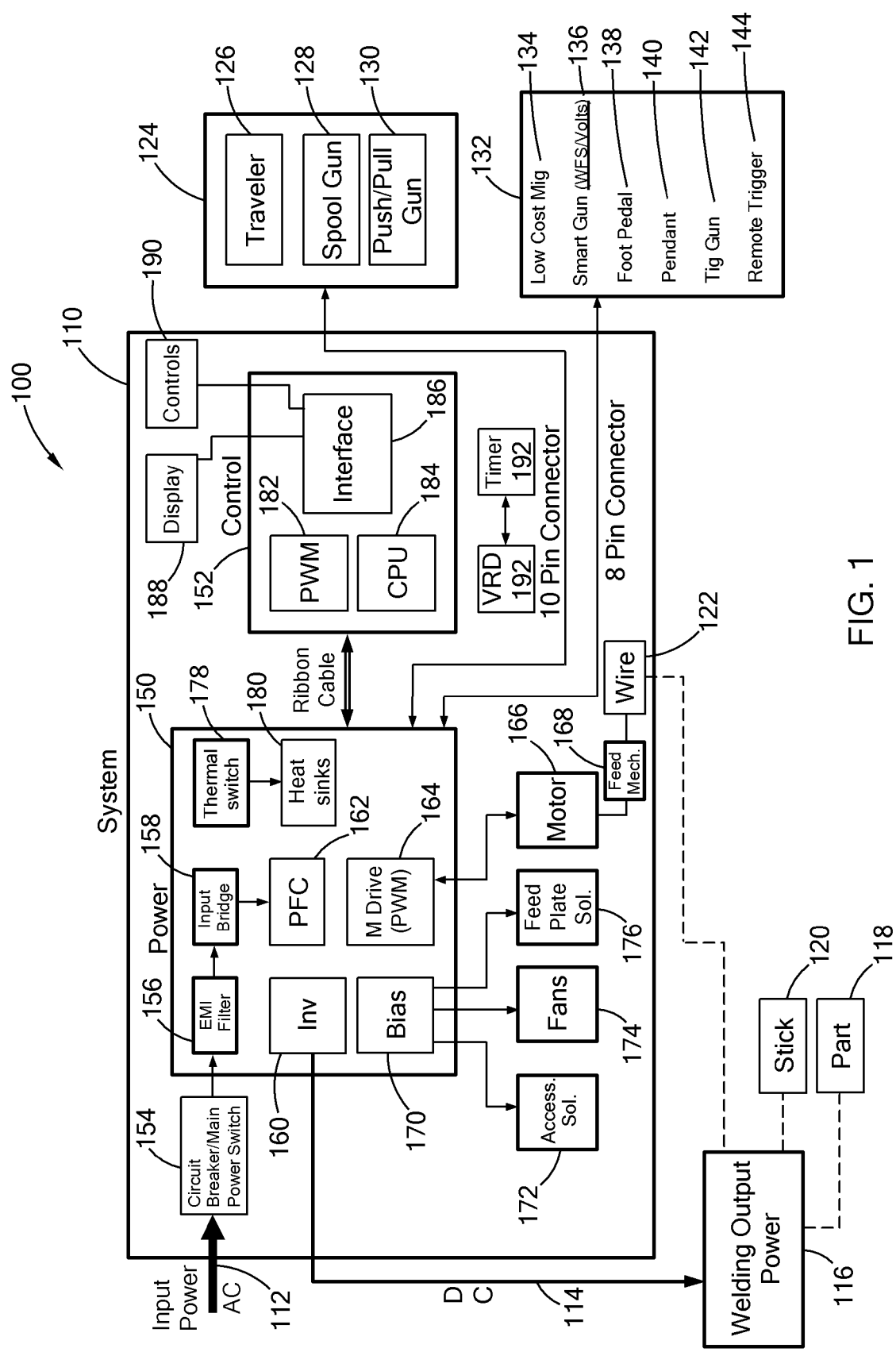
FIG. 1 is a schematic view of a welding system.

Now referring to FIG. 1, a power supply for a welding system 100 is provided. The power supply 110 receives input power 112 which may be an alternating current power line, for example a 220 volt AC power line. However, it is understood that the power supply 110 may be adaptable to receive a range of voltages, for example between 187 to 276 volts AC. In addition, it may also be possible to configure the power supply for other voltage ranges depending on the application and required welding output power. The power supply 110 provides a direct current power output voltage 114 that may be used as a welding output power 116. In some implementations, the power supply 110 may be used for stick welding (also known as Shielded Metal Arc Welding or SMAW) or various other welding applications such as MIG (Metal Inert Gas, also known as gas metal arc welding or GMAW), flux core arc welding, TIG (tungsten inert gas welding, also known as Gas Tungsten Arc Welding or GTAW), plasma arc, or other welding processes. Therefore, in one example the current return lead of the welding output power 116 may be provided to a part 118 that is to be welded, and the supply voltage may be provided to an electrode, for example a stick 120 or wire 122. Therefore, as the stick 120 comes in contact with the part 118 an arc may be formed that melts both the base metal and electrode and cooperates to form a weld. In other implementations, the output voltage may be provided through a wire 122 which may be continuously fed to the part to form a continuous weld. In TIG mode the electrode is not melted, and generally only the base metal is melted.

The power supply 110 may control the output voltage and the output current, as well as the feeding of the wire to optimize the welding process. In addition, the power supply 110 may be connected to one group of accessories 124 including for example a remote wire feeder 126, a spool gun 128, or a push/pull gun 130. Further, the power supply 110 may be connected to other groups of accessories 132, for example through an 8-pin connector. The second group of accessories 132 may include a MIG gun 134, a smart gun 136, a foot pedal 138, a pendant 140, a TIG gun 142, and/or a remote control/trigger 144.

Within the power supply 110, the input power 112 may be provided to a circuit breaker or switch 154. Power may be provided from the circuit breaker 154 to a power circuit 150. The power circuit 150 may condition the input power to provide a welding output power 116, as well as, for powering various additional accessories to support the welding process. The power circuit 150 may also be in communication with the control circuit 152. The control circuit 152 may allow the user to control various welding parameters, as well as, providing various control signals to the power circuit 150 to control various aspects of the welding process. The power from the circuit breaker 154 may be provided to an EMI filter 156 of the power circuit 150. Power is provided from the EMI filter 156 to an input bridge 158. Power may be provided from the input bridge 158 to a conditioning circuit 162. The conditioning circuit 162 may include a boost circuit, a transformer, as well as a power factor correction circuit. Power is provided from the conditioning circuit 162 to the inverter 160 where the power is converted to a DC signal 114 thereby providing welding output power 116. Power may also be provided to a bias circuit 170 to power a number of accessories internal or external to the power supply 110 that facilitate operation of the power supply and welding process. For example, the bias circuit 170 may provide power to gas solenoid valves 172, fans 174, as well as, other accessory devices. In addition, power is provided to a motor drive circuit 164 that is in communication with a motor 166. The motor 166 may be in communication with a feed mechanism 168 configured to feed wire 122 to a weld gun for use in creation of the weld. The control circuit 152 may provide control signals to any of the previously mentioned circuits in the power circuit 150 to optimize the weld process and performance of the power supply 110. The control circuit 152 may include a pulse width modulator 182 and a processor 184 for analyzing various weld characteristics and calculating various weld parameters according to user settings, as well as, various feedback signals. In addition, an interface circuit 186 may be provided to control a display 188 that may provide information to the user of the welding system. The display 188 may include an LED display, a LCD display, or various other known display technology. The display may provide various menu choices to the user, as well as, providing various feedback on the welding process including the values of various parameters or graphs of previous welding characteristics. The controls 190 may also be in communication with the interface circuit 186 to allow the user to provide input such as various welding parameters to control the operation of the welding process.

The power supply 110 may further include a voltage reducing device (VRD) circuit 192, a low-power circuit that detects contact between the part 118 to be welded and the electrode. When an open circuit condition is detected between the electrode and the work piece, the VRD circuit 192 may reduce the maximum open circuit voltage to safe levels. When contact is made and/or the load is below a threshold resistance, the VRD circuit 192 may no longer reduce the voltage and thus may allow the welding system 100 to operate at full power. The VRD circuit 192 may be in communication with a timer 194. The timer 194 may be implemented as software as part of the control circuit 152, or may be comprised of an electronic circuit.

Figure 2A:
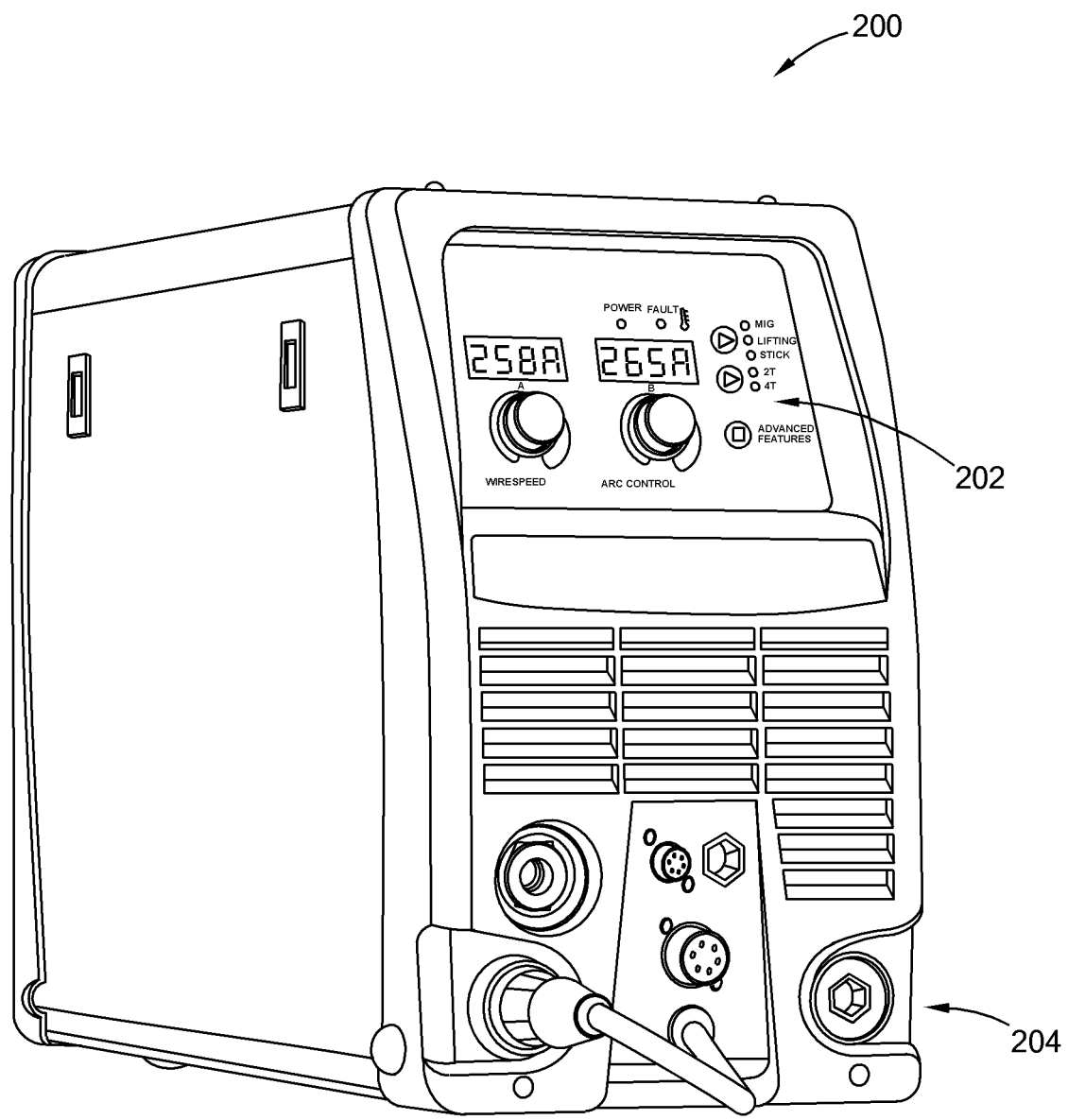
FIG. 2a is a perspective view of a housing which contains the welding system of FIG. 1.

Now referring to FIG. 2a, a housing 200 is provided that may be implemented with the welding system 100. The housing 200 may contain the power supply 110, and may further include a user interface 202 and a front connection panel 204. The front connection panel 204 may, for example, be used for connecting the power supply 110 to the first and second groups of accessories 124 and 132, as discussed above.

Figure 2B:
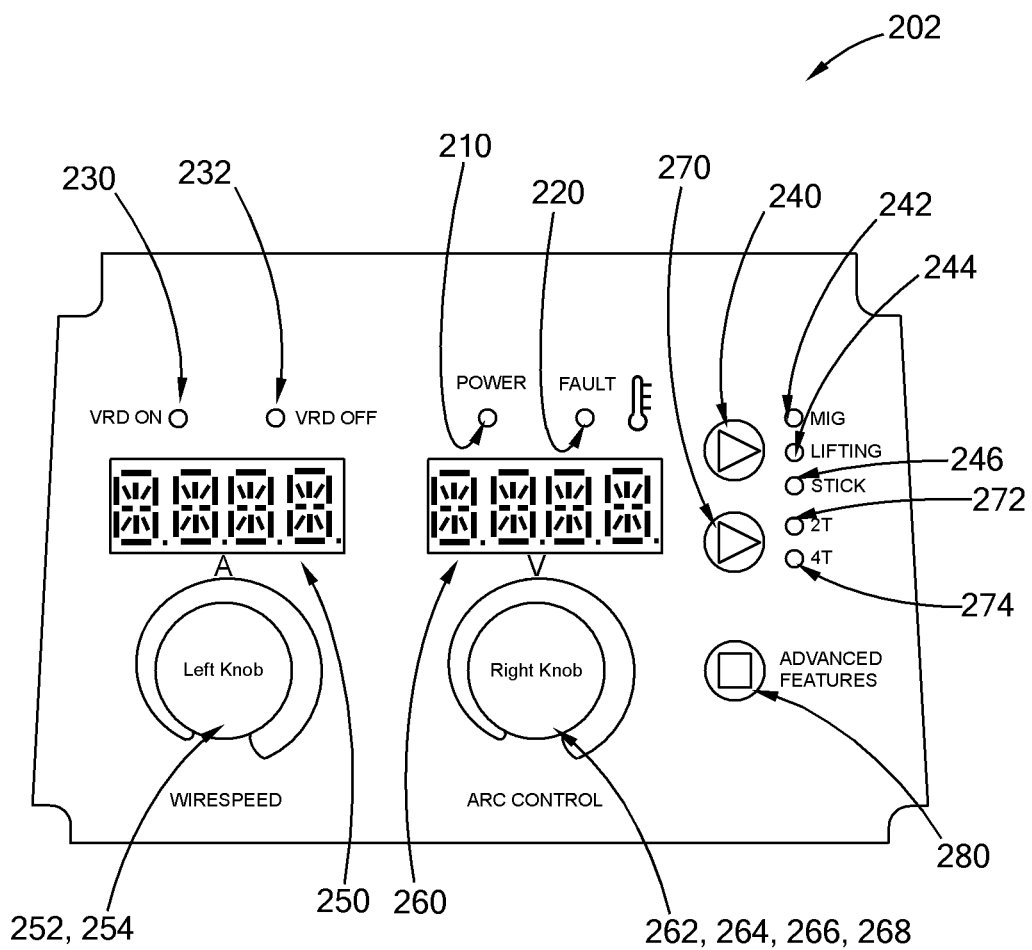

Now referring to FIG. 2b, a particular implementation of a user interface 202 is provided that may include various inputs selectable by a user and various indicators and displays. A power indicator 210 may indicate when the power supply 110 is receiving the input power 112. A fault light 220 may indicate when the welding process has entered a fault condition. A VRD "on" indicator 230 may indicate when the VRD is on, and a VRD "off" indicator 232 may indicate when the VRD is off.

A mode selection input 240 may allow the user to select a desired welding process. The mode selection input 240 may be a button which when pressed causes the power supply 100 to cycle through and select a welding process. Three welding process indicators 242, 244, 246 may respectively light upon selection of, for example, MIG, TIG, or stick welding. The MIG selection provides a suitable configuration for both gas metal arc welding and flux core arc welding.

A trigger interlock input 270 may allow a user to select between 2T and 4T modes for MIG, TIG and stick welds that are activated via an electric switch. The 2T mode allows the user to push and hold the switch to activate and release the switch to deactivate. The 4T mode allows the user to push and release the switch to activate, then push and release the switch again to deactivate. An indicator 272 may light when the 2T mode is selected, and an indicator 274 may light when the 4T mode is selected.

An amperage input 252 may allow a user to select a desired output current. A wire feed speed input 254 may allow a user to select a desired wire feed speed of the wire 122. The desired wire feed speed may be a desired steady-state wire feed speed. In some implementations, the inputs 252 and 254 may be combined into an adjustable knob. A user may press the adjustment knob to cycle between the inputs 252 and 254, and then turn the adjustment knob to select a desired value of the current or wire feed speed. The selected desired value may be displayed on a display 250, which may be a super bright red LED display.

A voltage input 262 may allow a user to select a desired output voltage of the welding signal. An inductance input 264 may allow a user to select a desired inductance which, for example, may optimize weld bead characteristics. An arc force input 266 may allow a user to select desired properties of arc force. A down slope input 268 may allow a user to select a down slope time, which is a function of the down ramp rate of the output current. In some implementations, the inputs 262, 264, 266, and 268 may be combined into an adjustable knob. A user may press the adjustment knob to cycle between the inputs 262, 264, 266, and 268, and then turn the adjustment knob to select a desired value of the voltage, inductance, arc force, or down slope. The selected desired value may be displayed on a display 260, which may be a super bright red LED display.

An advanced features input 280 may allow a user to select menus and toggle through various further inputs, which are displayed on the displays 250 and 260. A MIG welding main menu may provide inputs for operation control, pre-flow, spot on/off, spot time, stitch on/off, stitch time, dwell time, run-in setting, post-flow, burn back time, wire sharp, and/or a setup submenu. The setup submenu may provide inputs for wire feed units, amperage calibration, voltage calibration, wire speed calibration, arc hour display, VRD (on, off or triggered), total weld energy (for heat input computation), and/or factory defaults. A stick welding main menu may provide inputs for operation control, hot start on/off, hot start time, hot start amperage, and/or a setup submenu. The setup submenu may provide inputs for arc hour display, VRD disable, and factory defaults. The TIG main menu may provide inputs for operation control, pre-flow, post-flow, and a setup submenu. The setup submenu may provide inputs for arc hour display, VRD disable, and factory defaults.

Burn back time may refer to an adjustable period of time that the power supply 110 may provide power for the welding process after the wire feed stops in order to burn back the wire and prevent it from sticking in the weld puddle. Wire sharp refers to the application of predefined current outputs applied to the wire, for example, a rapid series of powerful current pulses after the motor 166 is de-energized. This prevents a ball of molten metal from freezing on the end of the welding wire, and tapers the end of the weld wire to a sharp point, promoting a cleaner start when welding resumes. The current outputs terminate when an open-circuit is detected or after a predefined time or condition is reached.

Most modern GMAW welding machines provide a means of user selectable run-in speed, a rate of wire feed that differs from the user selected steady-state wire feed speed. It allows an alternate, usually slower, motor speed at the beginning of a weld procedure to expedite formation of a stable molten weld pool. A menu in the advanced features input 280 may allow a user to select the run-in speed by choosing a run-in setting. The run-in setting may be implemented in a number of ways. First, for example, the run-in setting may be a selectable ratio or percentage of the welding wire feed speed, wherein the run-in speed is equal to the selectable percentage multiplied by the welding wire feed speed setting. Run-in percentage refers to a percent of wire feed speed. The percentage may range, for example, from about 25 percent to about 150 percent of the wire feed speed. Second, for example, the run-in setting may be a selectable run-in speed. The run-in setting may, for example, allow a user to temporarily alter the selected wire feed speed to optimize MIG weld start characteristics.

The control circuit 152 may receive each of the quantities respectively associated with each of the inputs. Further, although the above inputs are shown in particular implementations, each of the inputs may be configured as a dial, adjustment knob, button, or switch, for example. Additionally, in some implementations, some of the inputs may be automatically selected by the control circuit 152. Which inputs are automatically selected and which inputs are user-selectable may depend on which welding process is selected. In some implementations, some parameters, for example wire diameter, material, gas, and joint design, may not be programmed into the control circuit 152.

Figure 3:
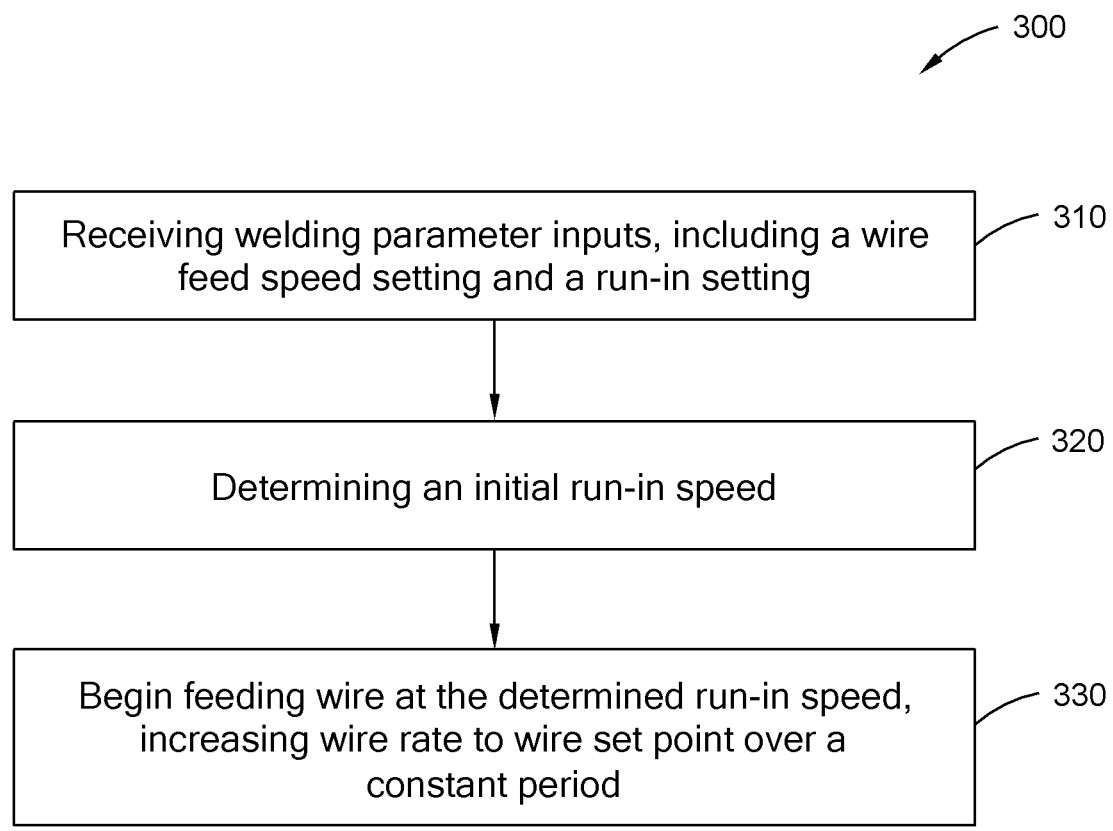
FIG. 3 is a flow chart illustrating a method for improved run-in speed control.

Now referring to FIG. 3, a method 300 for improved run-in speed control is provided. The method may be implemented in a welding process, for example gas metal arc welding, which is implemented when the MIG welding setting is selected. The method allows a user to temporarily alter the selected wire feed speed to optimize MIG weld start characteristics. The ordering of the steps presented herein is merely one implementation of the method 300. Those skilled in the art will recognize that the ordering may be varied, that some steps may occur simultaneously, that some steps may be omitted, and that further steps may be added. Moreover, each step involving the controller may be implemented by configuring (e.g. programming) the controller to perform the step.

The method 300 starts in block 310. In block 310, the control circuit 152 may receive the run-in setting from the run-in setting input and the welding wire feed speed setting from the wire feed speed input. In one implementation, the run-in setting is a user-selectable percentage ranging from 30 percent to 150 percent of the welding wire feed speed, or in another implementation, from a user-selectable value of 3 to 15 wherein the values refer to percentages of the welding wire feed speed. For example, 3, 8, 10, 12, and 15 respectively refer to 30% (or 0.3), 80% (or 0.8), 100% (or 1), 120% (or 1.2), and 150% (or 1.5). In some implementations, the control circuit 152 may also receive additional parameters such as the voltage, wire feed speed, inductance, burn-back time, and/or wire sharp setting from their respective inputs. In these implementations, the percentage may be adjusted as a function of one or more of these additional parameters. The method 300 may proceed from block 310 to block 320.

In block 320, the control circuit 152 may determine and store an effective run-in speed. The effective run-in speed may be based on both the run-in setting and the welding wire feed speed. As discussed, the run-in setting may be a selectable percentage of the welding wire feed speed. Further, the effective run-in speed may be a function of the run-in setting as well as other parameters. For example, the effective run-in speed may be a function the run-in setting, the wire feed speed setting (inches/minute), the maximum selectable wire feed speed or any combination of these parameters.

In some implementations, the effective run-in speed and effective run-in percentage may be calculated as follows. The variables $W_S$, $P_S$, $S_S$, M, $P_+$, $S_+$, $P_E$, and $S_E$, in the following formulas are defined as follows: (1) $W_S$ represents user-selectable wire feed speed. The welding wire feed speed may be expressed in inches per minute (ipm) or meters per minute, and defines the steady state wire feed speed during the welding process; (2) $P_S$ represents the user-selectable run-in percentage, which may be a percent of the of the selected wire feed speed during run-in, and may range between 30% and 150%, as discussed above; (3) $S_S$ is the run-in speed based on the user-selectable run-in percentage, or may rather be a user-selected run-in speed; (4) M represents the maximum selectable wire feed speed which may be a predefined constant and is often is near the maximum motor speed. In many systems, the maximum selectable wire feed speed is a value between about 600 and 800 inches per minute, and more specifically may be about 700 inches per minute; (5) $P_+$ represents extra run-in percentage, (6) $S_+$ represents extra run-in speed, (7) $P_E$ represents effective run-in percentage, and (8) $S_E$ represents effective run-in speed.

Normally, during run-in at the start of the welding process, the feed mechanism 168 may feed the wire 122 at the run-in speed $S_S$:

$$S_S = W_S P_S$$

However, the feed mechanism 168 may also provide an additional extra run-in speed $S_+$:

$$S_+ = W_S P_+$$

Thus, the feed mechanism 168 may feed the wire 122 at the effective run-in speed $S_E$:

$$S_E = S_S + S_+ = W_S P_E = W_S(P_S + P_+)$$

The extra run-in percentage $P_+$ may be defined as follows:

$$P_+ \equiv \frac{1}{4}\left(\frac{M - W_S}{M}\right)^2 |1 - P_S|$$

Thus, the effective run-in percentage $P_E$ is:

$$P_E = P_S + P_+ = P_S + \frac{1}{4}\left(\frac{M - W_S}{M}\right)^2 |1 - P_S|$$

And the effective run-in speed $S_E$ is:

$$S_E = W_S P_E = W_S\left[P_S + \frac{1}{4}\left(\frac{M - W_S}{M}\right)^2 |1 - P_S|\right]$$

In some circumstances, an additional adjustment to $S_E$ may be implemented. For example, the determined run-in speed $S_E$ may be higher than a first predefined speed, for example the maximum motor speed (which may, for example, be the same as the maximum selectable wire feed speed M). This may occur, for example, when the selected run-in percentage $P_S$ is higher than 1 (or 100%, or about 1, or about 100%) and the selected wire feed speed $W_S$ is near its selectable maximum. To solve this problem, $S_E$ may be set to the first predefined speed (or about the first predefined speed), for example the maximum motor speed (or the maximum selectable wire feed speed M), to ensure that the motor does not run beyond maximum capacity. In another example, the determined run-in speed $S_E$ may be lower than a second predefined speed (that is lower than the first predefined speed), for example a minimum motor speed (which may, for example, be the same as a minimum selectable wire feed speed). This may occur, for example, when the selected run-in percentage $P_S$ is below 1 (or 100%, or about 1, or about 100%) and the selected wire feed speed $W_S$ is near its selectable minimum. To solve this problem, $S_E$ may be set to the second predefined speed (or about the second predefined speed), for example the minimum motor speed (or the minimum selectable wire feed speed).

Because of the absolute value term $|1-P_S|$, when the selected run-in percentage $P_S$ is 1 (representing 100%), the extra run-in percentage $P_+$ and the extra run-in speed $S_+$ are both zero. But as the selected run-in percentage diverges from 1 (increases above 1 or decreases below 1), $P_+$ and $S_+$ both increase.

Additionally, because of the term $[(M-W_S)/M]^2$, both $P_+$ and $S_+$ are zero (or at their minima) when the selected wire feed $W_S$ is set to its maximum M. As the selected wire feed $W_S$ decreases from its maximum M to its minimum, the extra run-in percentage $P_+$ and thus the effective run-in percentage $P_E$ increase. This increase ensures that the motor command signals are not reduced to levels that produce unreliable speed control. The method 300 may proceed from block 320 to block 330.

In block 330, the control circuit 152 may provide the determined effective run-in speed $S_E$ to the motor drive circuit 164 which causes the motor 166 and feed mechanism 168 to feed the wire 122 to the weld gun at the determined effective run-in speed $S_E$ during the start of the welding process. The extra run-in speed $S_E$ improves continuity of run-in adjustment when operators select combinations of wire feed speed settings and run-in settings that approach the limits of reliable motor drive operation. Providing the extra run-in speed $S_+$ also decreases the chance that the motor 166 will stall and appear defective.

Some control schemes use voltage and current feedback from the motor drive to compensate for varying torques needed to overcome disparate degrees of friction in the wire drive. Although the feedback scheme performs satisfactorily across the range of wire speeds typically used in Gas Metal Arc Welding, it is prone to fail at extreme low speeds. The motor may not turn using the feedback scheme because the feedback signals are too feeble to compensate for excessive friction. Additionally, when a slow setting for wire feed speed is multiplied by a run in factor that is, for example, less than 1.0 (or 100%), some welders might compute a motor speed and produce a command signal that is too low for reliable operation. Attempts to limit or cap the minimum adjusted motor speed computation could make wire speed and run-in settings seem unresponsive. Small changes in either still produce values below the threshold, so they have no effect on performance. The minimum reliable motor control speed of such welders may be near the desired minimum for steady state operation, so reliable operation had to be attained at the expense of an apparent wide "dead" band of combined wire speed and run-in. The alternate choice, allowing small products of run-in and wire speed, risked causing the motor to fail to turn if feed friction were unusually high or motor magnets were especially weak.

The method 300 solves all of these problems. First, since effective run-in speed $S_E$ may be determined by way of a predefined formula, feedback is not required and thus feeble feedback does not affect the effective run-in speed $S_E$. Second, the method 300 eliminates the cost of a tachometer that is mechanically coupled to the motor 166 or wire drive, substituting a few relatively inexpensive electronic components, such as operational amplifiers, resistors, capacitors and diodes, to govern wire speed. Third, the method 300 improves continuity of run-in adjustment when operators select combinations of wire speed and run-in that approach limit of reliable motor drive operation. The method 300 decreases the likelihood that the wire drive system will stall and appear defective. By reducing the extra run-in percentage $P_+$ as selected run-in percentage $P_S$ approaches 100%, the compensation is nullified, allowing any arbitrary wire speed to be verified by timed wire feed measurements. Finally, since $P_+$ becomes almost imperceptible at higher speeds, users perceive the settings intuitively as a simple percentage instead of a complicated, nonlinear computation.

Figure 4:
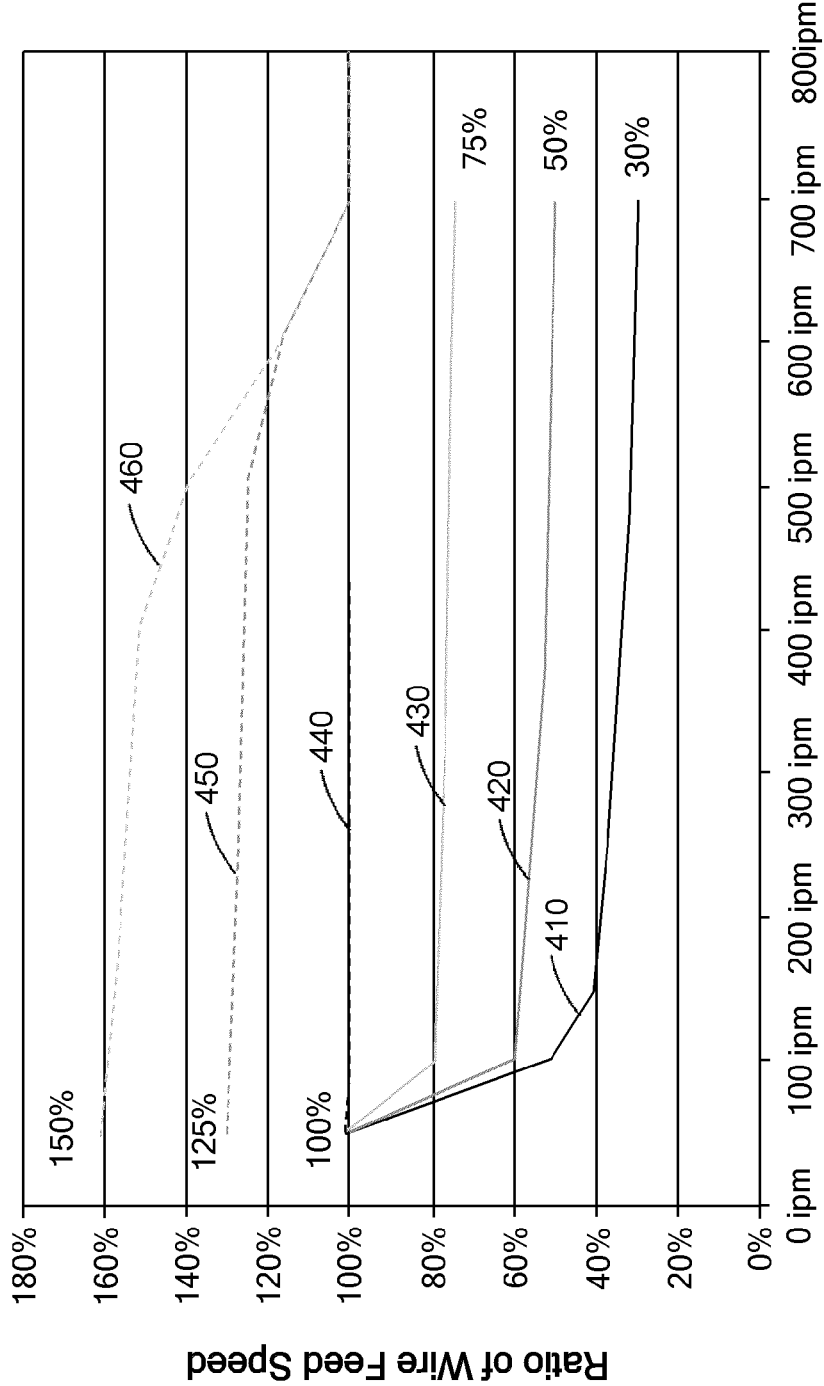
FIG. 4 is a graph illustrating effective run-in speed as a function of selected wire feed speed setting and selected run-in setting.

Now referring to FIG. 4 and Table 1 below, a graph 400 and a chart are provided showing effective run-in percentage $P_E$, as defined above, as a function of selected wire feed speed $W_S$ and selected run-in percentage $P_S$ when 700 inches per minute is the maximum selectable wire feed speed M and is the maximum rate at which the motor 166 can feed wire 122. The selected wire feed speed $W_S$ varies between 50 inches per minute and 700 inches per minute. The selected run-in percentage $P_S$ varies between 30% and 150% (or 0.3 to 1.5). The relationships between effective run-in percentage $P_E$ and selected wire feed speed $W_S$ for selected run-in percentages $P_S$ of 30%, 50%, 75%, 100%, 125%, and 150% are respectively designated by reference numerals 410, 420, 430, 440, 450, and 460. In Table 1, the five single-starred effective run-in percentages $P_E$ in the lower-right quadrant and their corresponding effective run-in speeds $S_E$ are adjusted to ensure that the effective run-in speeds $S_E$ do not exceed the maximum rate at which the motor 166 can feed the wire 122. Additionally, the five double-starred effective run-in percentages $P_E$ in the upper-left quadrant and their corresponding effective run-in speeds $S_E$ are adjusted to ensure that the effective run-in speeds $S_E$ do not fall below a minimum speed, shown in Table 1 as 51 inches per minute. All other effective run-in percentages $P_E$ in Table 1 are not adjusted, and instead follow the formula.

TABLE 1

| | | Wire feed speed $W_S$ (ipm) | | | | | | | | | |
|---|---|---|---|---|---|---|---|---|---|---|---|
| | | 50 | 100 | 150 | 200 | 250 | 300 | 400 | 500 | 600 | 700 |
| Run-in $P_S$ (%) | 30% | 102%** | 51%** | 41% | 39% | 37% | 36% | 33% | 31% | 30% | 30% |
| | 50% | 102%** | 59% | 58% | 56% | 55% | 54% | 52% | 51% | 50% | 50% |
| | 75% | 102%** | 80% | 79% | 78% | 78% | 77% | 76% | 76% | 75% | 75% |

TABLE 1-continued

| | Wire feed speed $W_s$ (ipm) | | | | | | | | | |
|---|---|---|---|---|---|---|---|---|---|---|
| | 50 | 100 | 150 | 200 | 250 | 300 | 400 | 500 | 600 | 700 |
| 100% | 102%** | 100% | 100% | 100% | 100% | 100% | 100% | 100% | 100% | 100% |
| 125% | 130% | 130% | 129% | 128% | 128% | 127% | 126% | 126% | 117%* | 100%* |
| 150% | 161% | 159% | 158% | 156% | 155% | 154% | 152% | 140%* | 117%* | 100%* |

Figure 5:
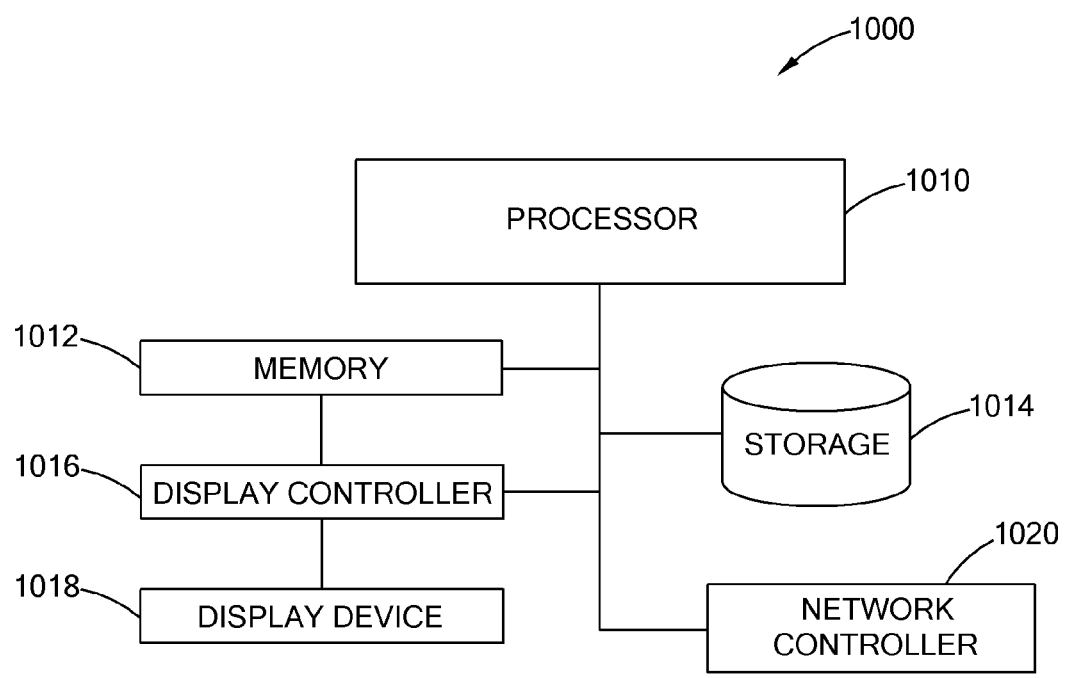
FIG. 5 is a schematic view of a processing system for implementing the methods described herein.

Any of the controllers, control circuits, modules, servers, or engines described may be implemented in one or more computer systems or integrated controllers. One exemplary system is provided in FIG. 5. The computer system 1000 includes a processor 1010 for executing instructions such as those described in the methods discussed above. The instructions may be stored in a computer readable medium such as memory 1012 or storage devices 1014, for example a disk drive, CD, or DVD, or in some form of nonvolatile memory, internal or external to the processor, such as EPROM or flash. The computer may include a display controller 1016 responsive to instructions to generate a textual or graphical display on a display device 1018, for example a computer monitor. In addition, the processor 1010 may communicate with a network controller 1020 to communicate data or instructions to other systems, for example other general computer systems. The network controller 1020 may communicate over Ethernet or other known protocols to distribute processing or provide remote access to information over a variety of network topologies, including local area networks, wide area networks, the Internet, or other commonly used network topologies.

In other embodiments, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system or processor. Further, in an exemplary, non-limited embodiment, implementations can include distributed processing, component/object distributed processing, and parallel processing. Alternatively, virtual computer system processing can be constructed to implement one or more of the methods or functionality as described herein.

Further, the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of this invention. This description is not intended to limit the scope or application of this invention in that the invention is susceptible to modification, variation and change, without departing from spirit of this invention, as defined in the following claims.

What is claimed is:

1. A system for providing improved run-in control in a welding process, the system comprising:
   a power circuit for generating welding output power for a welding process; and
   a control circuit in communication with the power circuit to control the welding process, the control circuit being configured to:
   receive a selection of a wire feed speed setting representing a wire feed speed;
   receive a selection of a run-in setting representing a run-in percentage of the wire feed speed; and
   determine an effective run-in percentage that is equal to the run-in percentage plus an extra percentage, wherein the extra percentage is computed based on the selection of the wire feed speed setting and a predefined constant, and wherein the predefined constant is based on a maximum selectable motor feed speed.

2. The system of claim 1 wherein the extra percentage is zero when the run-in percentage is 100%.

3. The system of claim 1 wherein the extra percentage increases as the run-in percentage increases above 100%.

4. The system of claim 1 wherein the extra percentage increases as the run-in percentage decreases below 100%.

5. The system of claim 1 wherein the extra percentage decreases as the wire feed speed setting approaches its maximum selectable setting.

6. The system of claim 1 wherein the extra percentage is zero when the wire feed speed setting is set to its maximum selectable setting.

7. The system of claim 1 wherein the extra percentage increases as the wire feed speed setting approaches its minimum selectable setting.

8. The system of claim 1 further comprising a feed mechanism configured to feed wire at a start of the welding process at an effective run in speed that is equal to the determined effective run-in percentage multiplied by the wire feed speed.

9. A method for providing improved run-in control in a welding process, the method comprising:
   by a power circuit:
   generating welding output power;
   by a control circuit in communication with the power circuit to control the welding process:
   receiving a selection of a wire feed speed setting representing a wire feed speed;
   receiving a selection of a run-in setting representing a run-in percentage of the wire feed speed; and
   determining an effective run-in percentage that is equal to the run-in percentage plus an extra percentage, wherein the extra percentage is computed based on the selection of the wire feed speed setting and a predefined constant, and wherein the predefined constant is based on a maximum selectable wire feed speed.

10. The method of claim 9 wherein the extra percentage is zero when the run-in percentage is 100%.

11. The method of claim 9 wherein the extra percentage increases as the run-in percentage increases above 100%.

12. The method of claim 9 wherein the extra percentage increases as the run-in percentage decreases below 100%.

13. The method of claim 9 wherein the extra percentage decreases as the wire feed speed setting approaches its maximum selectable setting.

14. The method of claim 9 wherein the extra percentage is zero when the wire feed speed setting is set to its maximum selectable setting.

15. The method of claim 9 wherein the extra percentage increases as the wire feed speed setting approaches its minimum selectable setting.

16. The method of claim 9 further comprising feeding wire at a start of the welding process at an effective run in speed that is equal to the determined effective run-in percentage multiplied by the wire feed speed.

17. A system for providing improved run-in controlling a welding process, the system comprising:
a power circuit for generating welding output power for a welding process; and
a control circuit configured to:
receive a selection of a wire feed speed setting representing a wire feed speed;
receive a selection of a run-in setting representing a run-in speed that is a run-in percentage of the wire feed speed; and
determine an effective run-in speed that is equal to the run-in speed plus an extra speed, wherein the extra speed is computed based on the selection of the wire feed speed setting and a predefined constant, and wherein the predefined constant is based on a maximum selectable wire feed speed.

18. The system of claim 17 wherein the extra speed is zero when the run-in speed is equal to the wire feed speed.

19. The system of claim 17 wherein the extra speed increases as the run-in speed increases above the wire feed speed.

20. The system of claim 17 wherein the extra speed increases as the run-in speed decreases below the wire feed speed.

21. The system of claim 17 wherein the extra speed decreases as the wire feed speed setting approaches its maximum selectable setting.

22. The system of claim 17 wherein the extra speed is zero when the wire feed speed setting is set to its maximum selectable setting.

23. The system of claim 17 wherein the effective run-in speed is equal to an effective run-in percentage multiplied by the wire feed speed, wherein the effective run-in percentage is equal to the run-in percentage plus an extra percentage, wherein the extra percentage increases as the wire feed speed setting approaches its minimum selectable setting.

24. The system of claim 17 further comprising a feed mechanism configured to feed wire at a start of the welding process at the effective run in speed.

* * * * *